Figure 1:
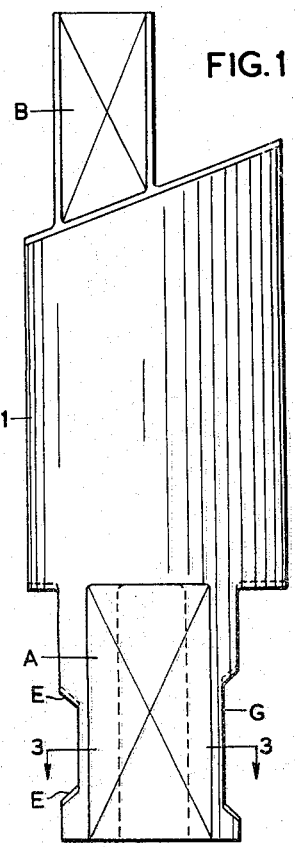

Aug. 15, 1961 J. A. LORETT ET AL 2,996,279

GAS TURBINES

Filed July 16, 1956 2 Sheets-Sheet 1

United States Patent Office 2,996,279
Patented Aug. 15, 1961

2,996,279
GAS TURBINES
Jerzy Andre Lorett, Whetstone, and Adolf Frankel, Newcastle-upon-Tyne, England, assignors to The English Electric Company Limited, London, England, a British company
Filed July 16, 1956, Ser. No. 597,994
1 Claim. (Cl. 253—39.1)

The invention relates to gas turbines and is concerned with the method of manufacturing stator blades therefor, with the said stator blades as such, their assembly in the stator blading of the gas turbine, and with the gas turbine comprising such stator blading.

As regards the method according to the invention the stator blades are made from constant section strip metal extruded or rolled with the aerofoil profile required, by machining off both ends of the blade outside the working portion of the blade so as to form pegs at their outer diameter ends and lugs at their inner diameter ends adapted to engage, and to be clamped to, gas turbine stator blade supporting rings.

The stator blades according to the invention have pegs at the outer diameter ends the profile of which may be rectangular, and inscribed into a constant aerofoil-profile of the working portion of the blades. These pegs are designed to engage slots in rings of the stator and to act as radial keys.

At the inner diameter ends these blades have lugs the profile of which may be parallelogram-shaped with the small sides of the parallelogram parallel to planes perpendicular to the axis of rotation of the turbine, and they may have annular segment recesses with shoulders adapted to be clamped between corresponding shoulders of annular projections of clamping rings of the stator. This parallelogram-shape allows a greater part of the cross section area of the aerofoil profile of the working section to be used for the said lugs. The parallelogram need not, however, be fully inscribed to the aerofoil profile. If corners, or at the concave side of the profile, a part of the oblique parallellogram side are cut off, this has even the advantage of increasing the freedom of thermal expansion of the said lug when located in a parallelogram-shape slot of one of the said clamping rings.

The assembly of stator blading according to the invention consists of blades as described hereinbefore and clamped with their lugs provided at their inner diameter ends between clamping rings with radial and axial clearance between the said lugs and clamping rings, except on the faces of the shoulders of the said lugs and projections, so as to allow freedom of thermal expansion and the flow of a stream of cooling air.

The pegs at the outer diameter ends of the said stator blades penetrate through outer shroud plates into slots in an outer stator ring into which they fit with those of their faces which are parallel to the axis of rotation of the turbine and to the centre line of the stator blade, and having clearance both in the radial and axial direction so as to permit thermal expansion.

In the gas turbine according to the invention the said clamping rings are provided with labyrinth glands where they face the end faces of the rims of adjacent rotor discs and surround the hub portions thereof, cooling air being admitted through the said hub portion gland into the space between adjacent rotor discs enclosing the said clamping rings and lugs of the stator blades which cooling air escapes into the main gas stream of the gas turbine partly through the labyrinth glands facing the said rim end faces, and partly through the clearances left between the said lugs and the said clamping rings. Inner shroud plates having oblique slots corresponding to the profile of the non-recessed portions of the said lugs may be arranged between the inner diameter ends of the said blades and the said clamping rings.

Figure 5:
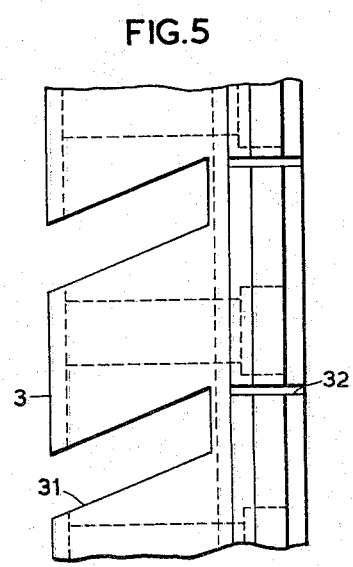
Figure 2:
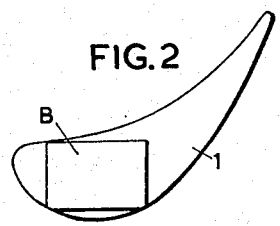
Figure 6:
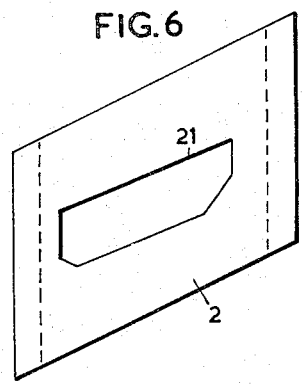
Figure 3:
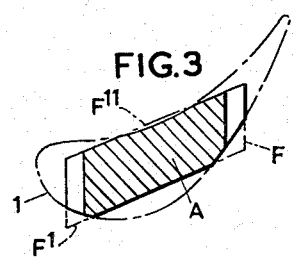
Figure 4:
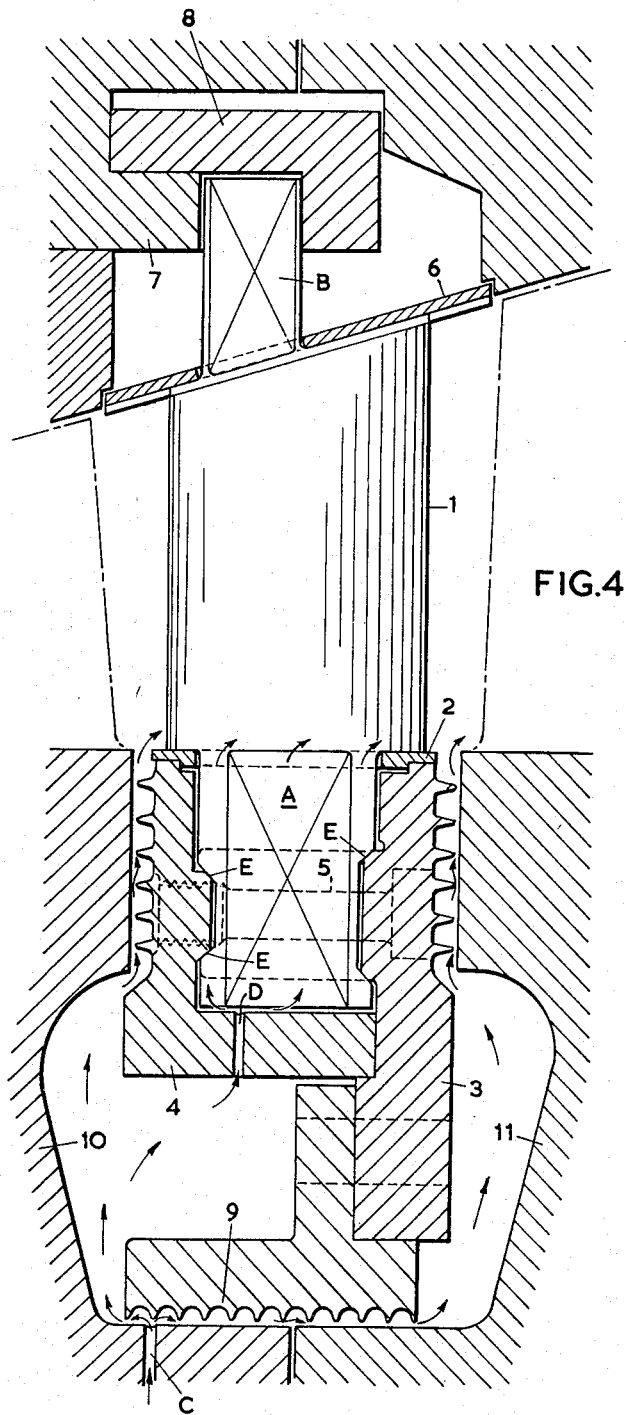

In order that the invention may be clearly understood and readily carried into effect an embodiment thereof will now be described by way of example with reference to the accompanying drawings in which:

FIG. 1 is an elevation of a stator blade manufactured according to the invention, FIG. 2 is an end elevation thereof as seen from the outer diameter end, FIG. 3 is a cross section along the line 3—3 of FIG. 1, FIG. 4 is an elevation of the stator blading assembly with the adjacent components of the rotor included for clarity, in section in a radial plane through the axis of rotation of the turbine, FIG. 5 is a view on the periphery of one of the clamping rings taken in the same direction as FIG. 3, and FIG. 6 is a view of an inner shroud plate taken in the same direction.

Referring first to FIGS. 1 to 3, extruded or rolled constant section strip metal having an aerofoil profile 1 as required for the particular stage of stator blading is cut off to the length required and machined at the inner diameter end so as to form parallelogram-shaped lugs A having annular segment recesses G on the short sides of the parallelogram which lie in planes perpendicular to the axis of rotation of the turbine, when the blades are fitted. The shoulders of these recesses are broken so as to provide conical seating faces.

As will be seen from FIG. 3 the parallelogram cross section of the lug A permits to use for it a considerable proportion of the profile area of the aerofoil 1. However, the parallelogram is not fully inscribed to the said aerofoil, parts being left off at F, F', F" on the corners and on that oblique side of the parallelogram which is at the concave side of the aerofoil. The inner diameter end face of the aerofoil portion 1 is machined off for example cylindrically as will be seen in FIG. 1.

On the outer diameter ends the strip metal, is, for example, machined off conically, leaving pegs B of a rectangular profile substantially inscribed to the aerofoil profile and having end faces lying on assembly in planes perpendicular to the axis of rotation, and side faces parallel to the said axis and to the longitudinal direction of the strip metal.

Referring now to FIG. 4 the lug A is clamped between chamfered shoulders E of annular projections of clamping rings 3 and 4 the said projections leaving a clearance between themselves and the recesses G of the lug A. Screws 5 pass from one of the said clamping rings 3, 4 to the other and, when tightened, effect the clamping of the lugs A. A gland ring 9 is flanged to the clamping ring 3 and forms a labyrinth gland with the hub portions of adjacent rotor discs 10 and 11. Labyrinth glands are also provided on the end faces of the said clamping rings 3 and 4 facing the end faces of the rims of the adjacent rotor discs 11 and 10, respectively.

The oblique parallelogram faces of the lugs A fit into corresponding recesses 31 of the clamping ring 3 (FIG. 5), the rim portion of which ring is provided with radial slits 32 to allow thermal expansion.

It will be seen from FIG. 4 that axial and radial clearances are left between the said lug A and the clamping rings 3, 4 except on the shoulders E where the actual clamping takes place. The lugs A penetrate through correspondingly shaped windows 21 of inner shroud plates 2 (FIG. 6), which are for example themselves parallelogram-shaped.

Cooling air is admitted in operation through drillings C in the hub portion of the rotor disc 10. This air passes with suitable pressure drops in both directions through the gland ring 9 into the spaces enclosed between the adjacent rotor discs 10, 11 and the clamping rings 4, 3 respectively and from there partly through drillings D into the clearance between the lugs A and the clamping rings 3, 4 and through the clearance between said lugs and the windows 21 in the inner shroud plates 2 into the main gas stream, and partly through the labyrinth glands between the end faces of the clamping rings 3, 4 and of the rims of the rotor discs 11, 10 respectively. The direction of flow of the cooling air is indicated in FIG. 4 by arrows.

The pegs B at the outer diameter ends of the stator blades penetrate through outer shroud plates 6 into recesses of a ring 7 of the gas turbine stator on which they abut laterally so as to transmit the torque reaction from the stator blading to the stator casing. However axial and radial clearance is left between the said pegs B and the said stator ring 7 and a retainer ring 8, respectively, allowing for thermal expansion.

It will be noted that only the strip metal of which the stator blades 1 with their lugs A and pegs B are made, and the inner and outer shroud plates 2 and 6 need be of high-quality heat resisting material, whereby considerable savings can be attained.

Also in the embodiment described, machining both of the blades proper and of the adjacent stator components is greatly simplified, and freedom of thermal expansion is safeguarded, while accurately locating the whole assembly of the stator blading in the gas turbine stator.

What we claim as our joint invention and desire to secure by Letters Patent is:

A gas turbine comprising in combination: a stator blading having gas turbine stator blade supporting rings, clamping rings having annular projections and blades each consisting of a constant aerofoil profile working portion having a lug at its inner diameter end of a reduced section within the said aerofoil profile, the said lugs having non-recessed portions and recessed portions, shoulders being formed between the said non-recessed and recessed portions, the said lugs being clamped with radial and axial clearance between the said clamping rings except on the faces of the said shoulders and of the said annular projections, so as to allow freedom for thermal expansion and the flow of cooling air between the said lugs and clamping rings, rotor discs having hub portions and labyrinth glands provided at the adjacent end faces and co-axial surfaces of the said hub portions of the said rotor discs adjacent the said clamping rings, cooling air being admitted through the labyrinth glands at the said hub portions into the space between adjacent rotor discs enclosing the said clamping rings and lugs of the stator blades, which cooling air escapes into the main gas stream of the gas turbine partly through the labyrinth glands facing the said end faces, and partly through the clearances left between the said lugs and the said clamping rings.

References Cited in the file of this patent

UNITED STATES PATENTS

| | | |
|---|---|---|
| 1,910,943 | Wiberg et al. | May 23, 1933 |
| 1,998,951 | Downer | Apr. 23, 1935 |
| 2,392,281 | Allen | Jan. 1, 1946 |
| 2,579,583 | Johnson | Dec. 25, 1951 |
| 2,606,742 | Giles | Apr. 12, 1952 |
| 2,671,634 | Morley | Mar. 9, 1954 |
| 2,720,356 | Erwin | Oct. 11, 1955 |
| 2,738,949 | Wilkinson | Mar. 20, 1956 |
| 2,772,069 | Hockert et al. | Nov. 27, 1956 |
| 2,772,856 | Kent et al. | Dec. 4, 1956 |
| 2,799,473 | Smith | July 16, 1957 |

FOREIGN PATENTS

| | | |
|---|---|---|
| 224,737 | Switzerland | Dec. 15, 1942 |
| 548,649 | Great Britain | Oct. 19, 1942 |
| 622,767 | Great Britain | May 6, 1949 |